(12) United States Patent
Feichtenschlager et al.

(10) Patent No.: US 7,981,343 B2
(45) Date of Patent: *Jul. 19, 2011

(54) METHOD AND APPARATUS FOR WELDING PLASTIC BODIES

(75) Inventors: Nikolaus Feichtenschlager, Braunau (AT); Andreas Junger, Franking (AT); Christian Auzinger, St. Peter/Hart (AT); Philipp Seidl, St. Peter/Hart (AT); Erich Katzlberger, Mettmach (AT); Dieter Nagel, Karlsbad-Langensteinbach (DE); Leopold Eisterlehner, Steinbach/Stayr (AT); Hannes Zaleschak, Ansfelden (AT)

(73) Assignees: Lisa Draexlmaier GmbH, Vilsbiburg (DE); Bayerische Motoren Werke Aktiengesellschaft, Munich (DE)

( * ) Notice: Subject to any disclaimer, the term of this patent is extended or adjusted under 35 U.S.C. 154(b) by 225 days.

This patent is subject to a terminal disclaimer.

(21) Appl. No.: 11/584,815

(22) Filed: Oct. 20, 2006

(65) Prior Publication Data

US 2007/0096362 A1 May 3, 2007

(30) Foreign Application Priority Data

Oct. 21, 2005 (DE) .................. 10 2005 050 571

(51) Int. Cl.
*B29C 65/20* (2006.01)
(52) U.S. Cl. ............... 264/248; 264/250; 156/304.2
(58) Field of Classification Search .............. 264/248, 264/250; 156/304.2
See application file for complete search history.

(56) References Cited

U.S. PATENT DOCUMENTS

| | | | |
|---|---|---|---|
| 1,974,337 A | 9/1934 | Magnani | |
| 3,276,941 A * | 10/1966 | Burns | 428/60 |
| 3,444,732 A * | 5/1969 | Mckinley et al. | 73/150 A |
| 4,390,384 A * | 6/1983 | Turner | 156/221 |
| 4,767,298 A * | 8/1988 | Bocchicchio et al. | 425/112 |
| 4,872,935 A * | 10/1989 | Newkirk et al. | 156/250 |
| 5,443,098 A | 8/1995 | Kertesz | |
| 6,135,158 A | 10/2000 | Kraus | |
| 6,234,132 B1 | 5/2001 | Kopec et al. | |
| 6,267,093 B1 | 7/2001 | Lohr | |
| 6,372,079 B1 * | 4/2002 | Coninck et al. | 156/304.2 |
| 6,540,868 B1 | 4/2003 | Kertesz | |

FOREIGN PATENT DOCUMENTS

| DE | 39 06 278 A1 | 8/1990 |
|---|---|---|
| DE | OS19701118 A1 | 7/1998 |
| DE | 199 53 746 C2 | 4/2003 |

* cited by examiner

*Primary Examiner* — Joseph S Del Sole
*Assistant Examiner* — James Sanders
(74) *Attorney, Agent, or Firm* — Wolf, Greenfield & Sacks, P.C.

(57) ABSTRACT

A method and apparatus for welding two or more subcomponents together is described. The subcomponents may be welded to one another along seams, whereby sections of the seam that comprise similar materials are heated to a degree suitable for joining together those particular portions of the seam. Other sections of the seam may be heated to a different degree depending upon the material characteristics employed in that section of the seam. Embodiments of the apparatus include features for holding the subcomponents, simultaneously heating seams of each component, positioning the mating subcomponents together, and applying pressure between mating subcomponents to join them together.

9 Claims, 4 Drawing Sheets

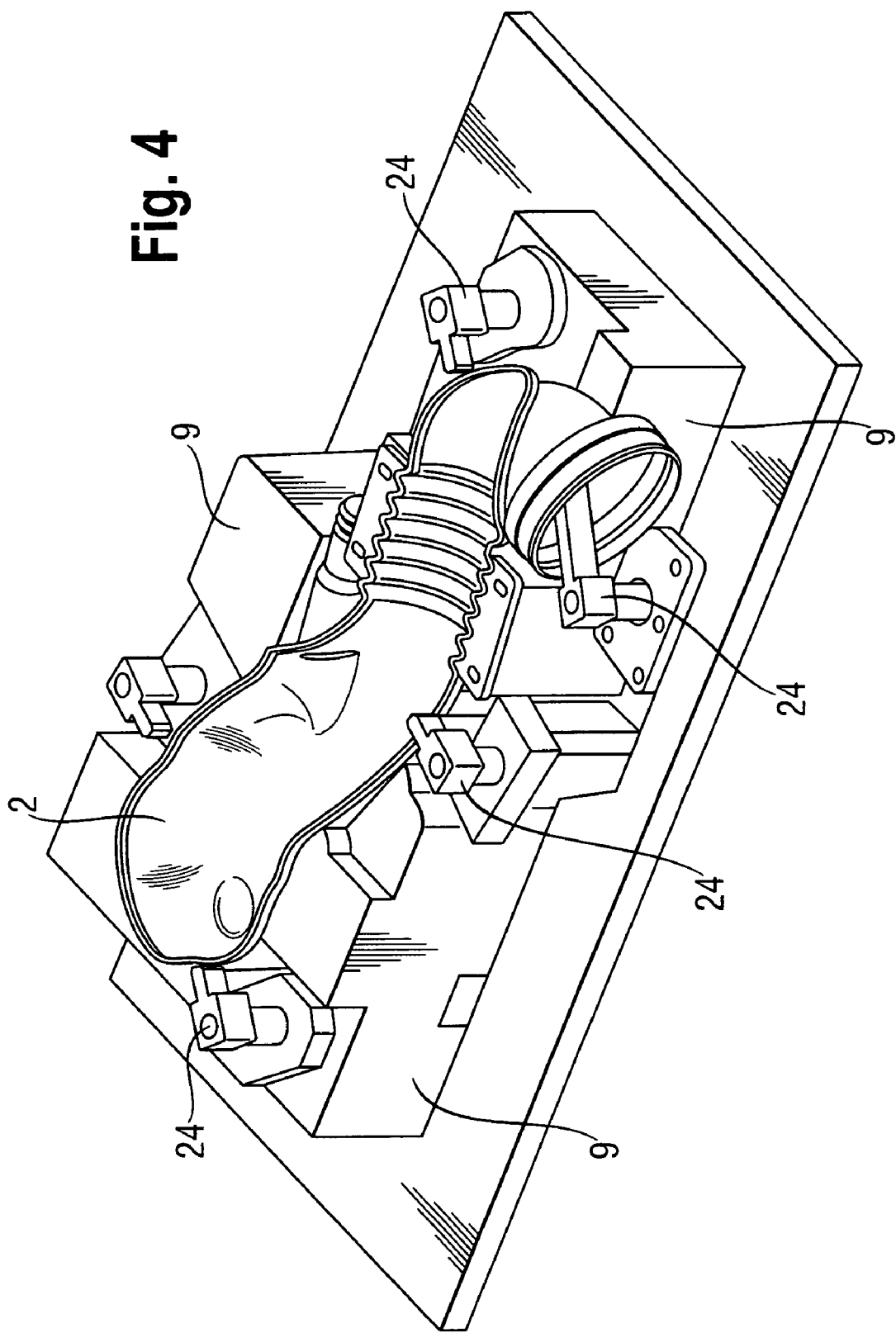

METHOD AND APPARATUS FOR WELDING PLASTIC BODIES

CROSS REFERENCE TO RELATED APPLICATION

Foreign priority benefits are claimed under 35 U.S.C. §119 (a)-(d) or 35 U.S.C. §365(b) of German Application No. DE 10 2005 050 571.6, filed Oct. 21, 2005, which is hereby incorporated by reference in its entirety.

BACKGROUND

1. Field

Aspects of the present invention relate to apparatus and methods for producing plastic components, and more particularly to apparatus and methods for producing plastic components for use in vehicles.

2. Discussion of Related Art

Hollow plastic component parts are often used for air conduction in vehicles, such as in intake manifolds, intake manifold modules, connection pipes between turbo chargers and internal combustion engines, filtering tubes, and the like. Often, these components are made of thermoplastic material and are formed either through blow molding techniques, lost core techniques, or injection molding techniques.

One known technique for forming plastic components is described in DE OS 197 01 118. This method involves injection molding half shell components and then joining the half shells together using plastic welding techniques. Forming plastic components with such an approach provides for a variety of design options, and may result in a sturdy molded plastic component. These prior art techniques, however, have been limited to the use of a common material for each of the half shell components.

Tubes that connect turbo chargers to internal combustion engines are often subject to movement, such as due to physical movement between the parts that are connected to the tube, or even due to thermal expansion and/or contraction of the tube itself. To accommodate this movement, prior art tubes often include bellows. Bellows may also prevent or reduce vibration and/or sound transmission.

Present manufacturing techniques are incapable of effectively forming complex hollow components from multiple types of plastic material. Although blow molding technology has been used to form components with both hard and soft plastic materials, these techniques can only be used to form simple shapes. Hollow bodies with complex shapes, undercuts, shoulders, and/or laterally projecting portions cannot be manufactured through blow molding techniques. Injection molding techniques also have drawbacks, as separate manufacture is required of each of the different materials, which are subsequently welded together through a complicated welding process.

SUMMARY

In one embodiment, a method of welding two or more molded or hollow body members manufactured using injection molding technology into a plastic molded or hollow body, so as to form components for air conduction in internal combustion engines is provided, The molded or hollow body members to be joined together each have at least two components. The method includes melting the molded or hollow body members to be welded together in a joining region by pressing thereon contact elements heated to the melting temperature of the respective component; and bringing the melted portions together by applying a molding pressure to form a completed component.

In another embodiment, an apparatus for carrying out the above-noted method is provided. The apparatus includes retainers constructed and arranged to hold the molded or hollow body members to be welded together and contact elements constructed and arranged to be brought to melting temperature. The retainers are constructed and arranged to be held at a distance from each other and the contact elements are simultaneously inserted into the joining region, brought into abutment against the joining regions, and retracted after completion of the melting. The retainers are constructed and arranged to be subsequently brought together for applying the molding pressure.

In yet another embodiment, an apparatus for forming a plastic component is provided. The apparatus includes a first fixture configured to hold a first subcomponent and a second fixture configured to hold a second subcomponent. A first set of heating elements is configured to heat first portions of the first and second subcomponents to a first temperature during a heating interval. A second set of heating elements is configured to heat second portions of the first and second subcomponents to a second temperature during the heating interval, the second temperature being different than the first temperature.

In still another embodiment, a method for welding two or more subcomponents together is provided. The method includes heating first portions of the first and second subcomponents to a first temperature during a heating interval, heating second portions of the first and second subcomponents to a second temperature during the heating interval, the second temperature being different than the first temperature, and joining the first and second subcomponents together whereby the first portions of the first and second subcomponents and the second portions of the first and second subcomponets are fused together.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

Various embodiments of the invention will now be described, by way of example, with reference to the accompanying drawings, in which:

FIGS. 3 and 4 are perspective representations of one embodiment of the configuration of the two retainers, each with a retained section or half of the component.

DETAILED DESCRIPTION

Figure 1:
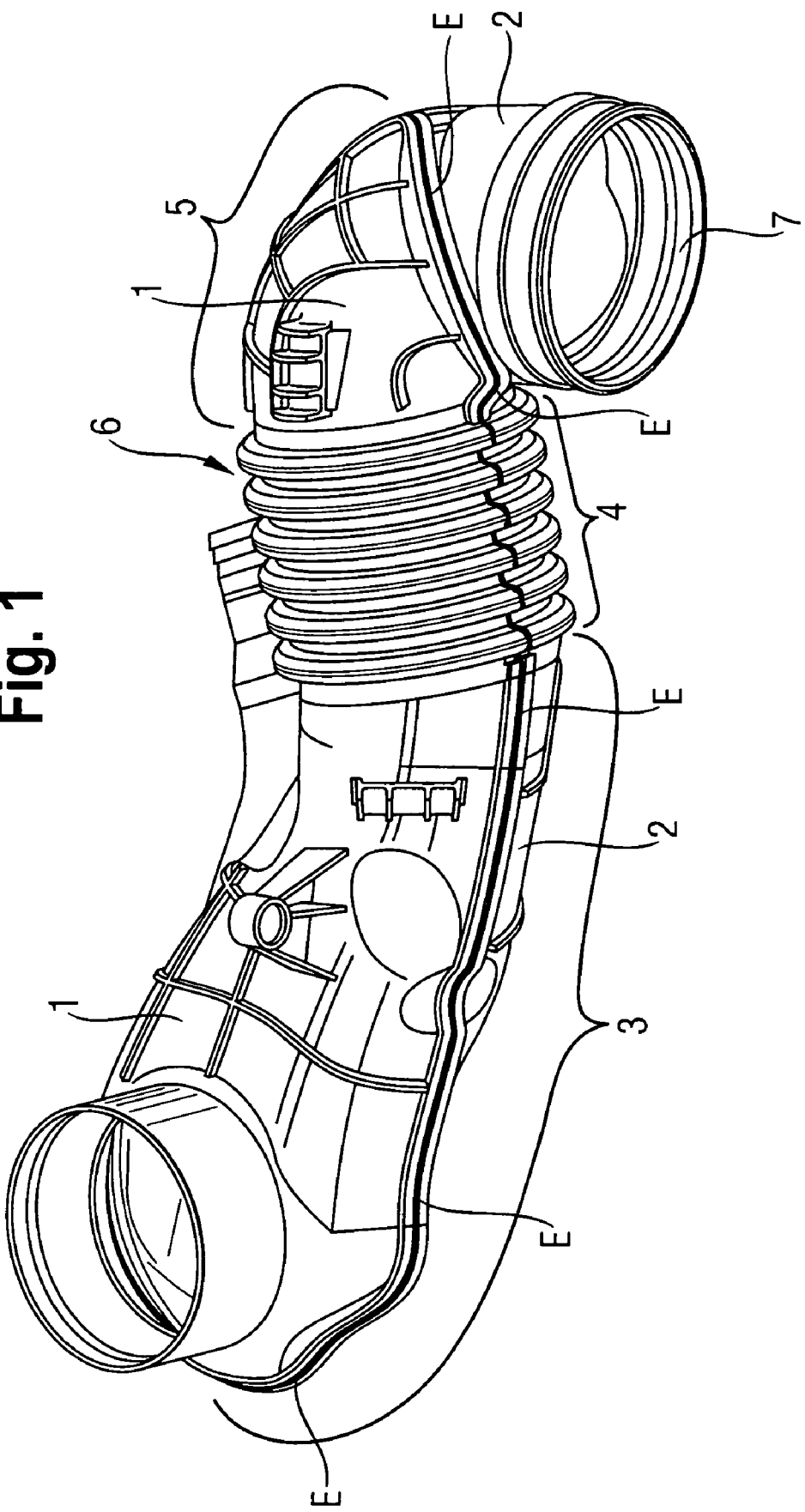
FIG. 1 is an exemplary molded component in which two sections or halves of the component are welded together to form the completed component.

Embodiments of the present invention provide an apparatus that may be used to form complex, hollow plastic components from two or more subcomponents. The subcomponents may each be made from multiple types of plastic materials, as described in greater detail in the patent application filed on the same date herewith under Ser. No. 11/584,353, under Express Mail No. EV743785795US, which is hereby incorporated by reference in its entirety. In this regard, the applicants have appreciated that there is a need for plastic components that incorporate different materials, such as materials that have different thermal properties, optical properties, and/or different resistances to various media. The applicants have also appreciated that there is a need to join one or more sections of the component or subcomponents together to form a single component.

The subcomponents may be welded to one another along seams, whereby sections of the seam that comprise similar materials are heated to a degree suitable for joining together those particular portions of the seam. Other sections of the seam may be heated to a different degree depending upon the material employed in that section of the seam. Embodiments of the apparatus include features for holding the subcomponents, simultaneously heating seams of each component, positioning the mating subcomponents together, and applying pressure between mating subcomponents to join them together.

Embodiments of the invention can include one or more retainers or fixtures, each configured to hold a corresponding subcomponent. The fixtures may be configured to hold the subcomponents at a distance from one another and then to move the subcomponents into contact with one another for fusing. The apparatus may provide access to portions of the subcomponents, such as seams of the subcomponents, when the fixtures are spaced apart from one another. In this regard, other tools, such as implements for heating the seams to melting temperature, may access the seams prior to the subcomponents being positioned in contact with one another. In some embodiments, the fixtures allow heating elements to abut the entire length of the seams of each subcomponent, although in other embodiments only portions of the seams are abutted by the heating elements.

Embodiments of the fixtures may include various features for contacting and/or holding subcomponents. In some illustrative embodiments, the fixtures are designed in block- or trough-like form and are provided with recesses on the sides facing each other. In one embodiment, the recesses have, at least in some areas, a negative form of the subcomponent such that the subcomponent fits within the recess. However, it should be appreciated that the present invention is not limited in this regard, as other suitable shapes of the fixtures for holding the subcomponents may be employed. Still, in some embodiments, the fixture may include clips, clamps or other holding arrangements that may aid in holding a subcomponent in place within the fixture. In some embodiments, these holders include tabs that rotate or swivel over the recess to hold the subcomponent therein. In this regard, the holder may aid in preventing the subcomponent from falling out when the fixture is inclined or placed in an overhead position.

The apparatus may include heating elements, which, in one embodiment, are formed as contact elements, to heat seams of the subcomponents, as may be required during plastic welding processes used to join the subcomponents together. According to some embodiments, the elements are positioned on a carrier that can move into position relative to the subcomponents that are held by the fixtures. The fixtures move the subcomponents toward the carrier until the heating elements are positioned in abutment with a portion of a seam that is to be heated. The elements may then heat the seam. Afterwards, the fixtures may retract the subcomponents from the heating elements. The carrier may then be retracted from between the fixtures. As explained, the subcomponents to be welded together are heated, at least partially, in the joining region by pressing heating elements heated to the welding temperature of the respective portion of the subcomponent and then bringing the members together by applying a molding or welding pressure. In one embodiment, the welding temperature is approximately the melting temperature of the material employed in the section to be joined together. However, the welding temperature may be some other suitable temperature that will enable subsequent fusing of the materials together, as the present invention is not limited in this regard.

In one embodiment, the elements may be heated to an amount that corresponds to a respective welding temperature of the area of the component to be joined. In one embodiment, these elements can be arranged arbitrarily along the joining portion required for a particular component.

The apparatus may include features to help heat sections of subcomponents to different temperatures. As described herein, seams of subcomponents may comprise different materials that have different melting temperatures. To help achieve heating the seams to different temperatures, in one embodiment, insulating portions are arranged between the heating elements. The insulating portions can be implemented in various ways, as the present invention is not limited in this regard. Thus, adequate insulating means or insulting materials can be arranged between the heating elements. In one embodiment, these may optionally be integrated in the opposing front faces of the heating elements. In the case of small temperature differences between the heating elements, it may suffice to provide a clearance or air gap between the heating elements to provide the necessary insulation.

In one embodiment, the workpiece upon which the welding apparatus acts, that is, the subcomponents, are manufactured by multi-component injection molding, although other suitable manufacturing techniques may be employed, as the present invention is not limited in this regard. Also, as described herein, the subcomponents are formed as half-shell-like components such that when the subcomponents are brought together, a hollow tube is formed so it can be used as an air duct for use in an automotive vehicle such as for intake air for an automotive internal combustion engine or for air used within the vehicle compartment. However, it should be appreciated that other shapes may be employed to produce a variety of different kinds of components suitable for a variety of different applications, as the present invention is not limited in this regard.

Turning now to the figures, and initially FIG. 1, a hollow plastic component that may be formed employing aspects of the invention is shown. The particular component shown in FIG. 1 is a clean air pipe made from two pipe section halves (i.e., subcomponents) for air conduction in internal combustion engines. In the exemplary embodiment, the component includes a first pipe section half 1 (located at the top of FIG. 1) and a second pipe section half 2 (located at the bottom of FIG. 1), which are welded together in a plane E. The plane E extends throughout the entire length of the component and may follow an unsteady (e.g., non-straight) course at some portions for structural reasons, or may be straight or indeed non-flat, as the present invention is not limited in this regard.

In one embodiment, the pipe section halves 1 and 2 are manufactured separately from each other using any suitable manufacturing technique, including known injection molding methods, and in one embodiment, are each made up of plastic sections of different hardness and/or materials. Thus, the pipe section half I includes a half shell section 3 made of hard plastic, followed by a half shell section 4 made of soft plastic (for forming a first half of the bellows 6) followed by a half shell section 5 made of hard plastic. Other suitable arrangements may be employed depending on the intended use of the component, as the present invention is not limited in this regard. In the illustrative pipe section, the half shell sections 3 and 5 are made of the same plastic material and thus the pipe section half 1 includes two differing materials.

The pipe section half 2 located at the bottom of FIG. 1 also includes a half shell section 3 made of hard plastic, followed by a half shell section 4 made of soft plastic (for forming the second half of the bellows 6) and also followed by a half shell section 5 made of hard plastic.

In one embodiment, due to the location of the plane E, the pipe section half 2 located at the bottom of FIG. 1 includes, in the region of the free end of its half shell section 5, a connecting portion 7 made of soft plastic material, which forms a flexible sleeve for connecting the air pipe to another pipe (not shown).

The exemplary pipe section half 2 thus consists of two half shell sections made of hard plastic, a half shell section 4 made of soft plastic and a connecting portion 7, which is also formed of soft plastic.

Figure 2:
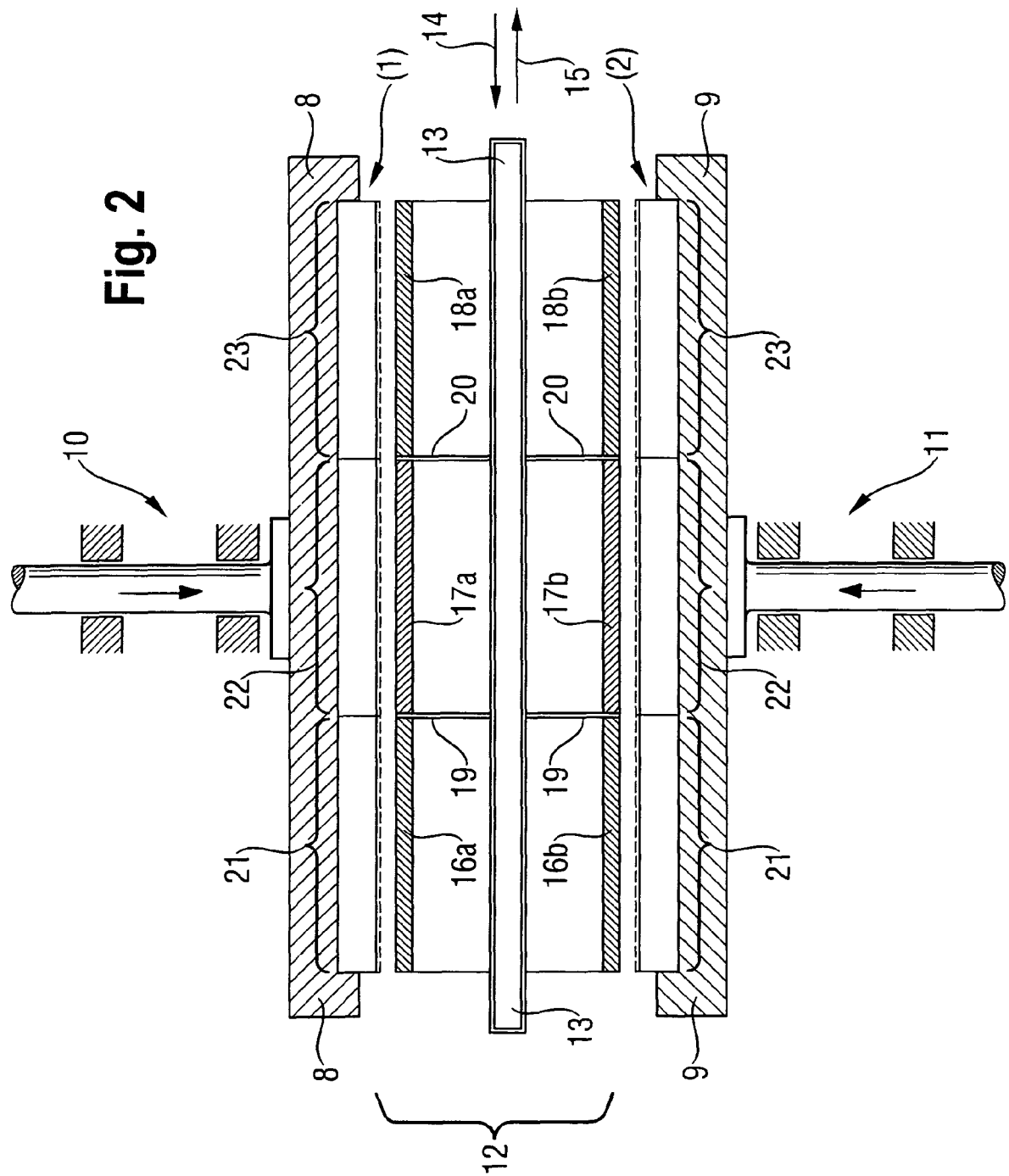
FIG. 2 is a schematic representation of an apparatus in which the sections or halves of the component, which are to be welded together, are each held in a retainer for carrying out the method according to an aspect of the invention.

The exemplary welding apparatus shown in FIG. 2 comprises an upper retainer 8 and a lower retainer 9. In one embodiment, each retainer or fixture is coupled to a frame. In one embodiment, both the upper retainer 8 and the lower retainer 9 are each mounted on guides 10 and 11 so as to be movable both towards and away from each other, as indicated schematically by the vertical arrows in FIG. 2, although only one need be movable, as the present invention is not limited in this regard.

The lower side of the upper retainer 8 is adapted to receive an upper pipe section half, as shown schematically in FIG. 2. The upper side of the lower retainer 9 is in turn designed such that a lower pipe section half can be inserted therein.

When so constructed, the upper retainer 8 can, for instance, receive the pipe section half 1, and the lower retainer 9 can receive the pipe section half 2 of the component shown in FIG. 1. The upper retainer 8 and the lower retainer 9 are each mounted and aligned towards each other within the apparatus such that when the upper retainer 8 and the lower retainer 9 are brought together, the two section halves or subcomponents will be accurately located one above the other on plane E in the region of their joining portions, as will still be described below in connection with the welding process.

As mentioned, the subcomponents, in this case the pipe section halves manufactured in a separate process and including half shell sections made of plastic materials of different hardness, are respectively inserted in the upper retainer 8 and the lower retainer 9 and are held in each retainer. The two retainers are separated in this condition and thus welding tools 12 can be inserted between the two subcomponent sections held in the retainers, as shown schematically in FIG. 2. In one embodiment, the welding tools are fixed on a carrier plate 13, which is either inserted in the direction of arrow 14 between the pipe section halves or moved out of the region of the pipe section halves, and thus of the retainers 8 and 9, in the direction of arrow 15.

The carrier plate 13 is equipped with heating elements 16, 17 and 18 for heating the subcomponents at the desired weld region. These heating elements can be heated to differing degrees and may be separated from each other by insulating layers 19 and 20. In one embodiment, heating elements are disposed both on the side facing the upper pipe section half and on the side facing the lower pipe section half. The heating elements of a corresponding pair of heating elements (for instance, 16a and 16b or 17a and 17b or 18a and 18b) each are heated to the same or approximately the same temperature. The temperature of the paired heating elements (for instance, 16a and 16b) is thereby selected in each case so as to correspond to the desired (e.g., melting) temperature of the section of the upper and lower section halves. If, for instance, section 21 of the upper and lower pipe section halves is made of a hard plastic material, the heating elements 16a and 16b will be adjusted to the melting temperature of the hard plastic material in section 21. This also applies to section 22, which may include, for instance, a soft plastic material. The heating elements 17a and 17b will thus be adjusted to the melting temperature of the soft plastic material of section 22, which may be different than the temperature of elements 16a and 16b. Section 23 may in turn include, for instance, a hard plastic material, with the heating elements 18a and 18b being adjusted to the melting temperature thereof, which also may be different from one or both of the other sets of heating elements.

Once the carrier plate 13 with the welding tools 12 has been inserted and fixed at its exact position with respect to corresponding sections of the upper and lower pipe section halves, the upper retainer and the lower retainer are brought together to such an extent that the heating elements will each abut against the corresponding sections in the region of the joining portions and the joining portions are thus brought to the desired welding (e.g., melting) temperature. In one embodiment, this process takes place simultaneously at all the joining portions given that, in this example, a continuously designed plane E is provided.

Once the desired temperature of the subcomponents has been reached, the upper and lower retainers are separated again and the welding tool 12 is moved out via the carrier plate 13 in the direction of arrow 15. Detection of the desired temperature at the surface of the weld area may be obtained using any suitable technique. In one embodiment, a separate temperature probe may be employed. In another embodiment, the welding tool may be held adjacent the subcomponents for a pre-set period of time.

After the welding tool is removed from between the two portions of the component, the upper retainer is again brought toward with the lower retainer so that the joining portions of the respective subcomponents brought to melting temperature will contact each other and the welding process can be carried out by applying a pressing force.

After a predetermined amount of time, the two retainers are separated again and the finished component—in this case the welded air pipe—is removed from the apparatus.

Figure 3:
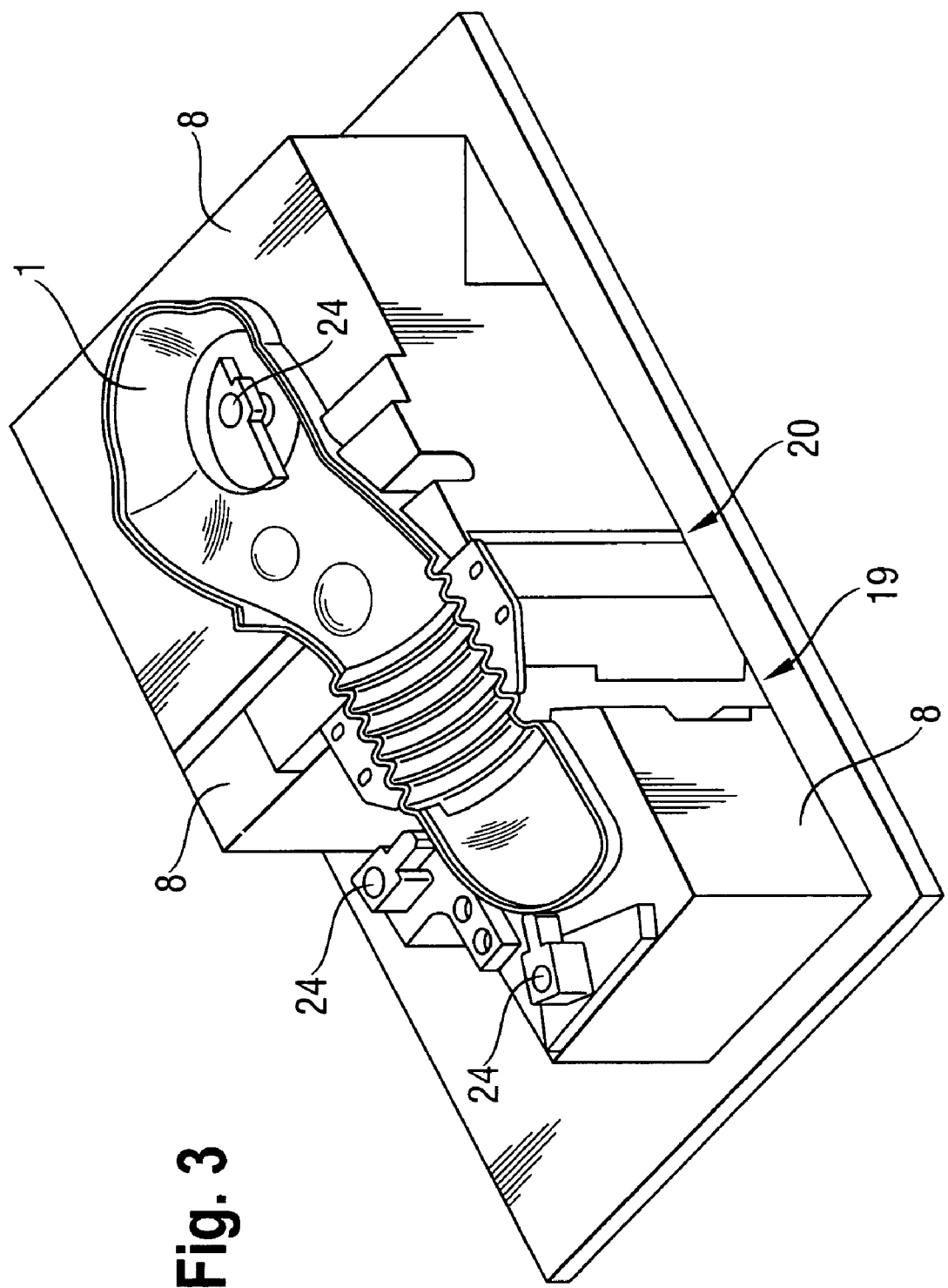

FIGS. 3 and 4 show a somewhat more specific representation of the design of the upper retainer 8 (FIG. 3) and the lower retainer 9 (FIG. 4) for the subcomponent halves 1 and 2 of the component (in this case, the air pipe shown in FIG. 1). Due to the shape of the pipe section halves, the retainers 8 and 9 are designed in trough-like form and have at least in some sections the negative form of the pipe section halves to be received.

As mentioned above, the retainers are to be moved towards and apart from each other. So as to prevent the pipe section halves from changing their position in the recesses of the retainers or even falling out therefrom during said movement, the retainers are equipped with clamping or holding elements 24. In one embodiment, these elements 24 are each mounted within the apparatus so as to be swivelable for the insertion or removal subcomponent sections and the finished component.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A method of welding two or more molded or hollow body members manufactured using injection molding technology into a plastic molded or hollow body, so as to form components for air conduction in internal combustion engines, comprising:

providing the molded or hollow body members with at least two components, each of the at least two components being made of materials having different melting temperatures, and each molded or hollow body member having a joining region including portions of each of the at least two components;

melting the molded or hollow body members to be welded together in the joining region of each molded or hollow body member by pressing thereon first and second contact elements heated to the melting temperatures of the respective joining region of each of the at least two components;

insulating the first contact element from the second contact element with an insulator that is disposed in between the portions of the first and second contact elements that are pressed in contact with the joining region of each of the at least two components as the molded or hollow body members are melted by the first and second contact elements; and bringing the melted portions together by applying a molding pressure to form a completed component.

2. A method for welding two or more subcomponents together comprising:

heating first portions of a first subcomponent and a second subcomponent having a first melting temperature to a first temperature during a heating interval through contact with a first heating element; heating second portions of the first subcomponent and the second subcomponent having a second melting temperature to a second temperature during the heating interval through contact with a second heating element, the second melting temperature being different than the first melting temperature;

insulating the first heating element from the second heating element with an insulating layer that is disposed in between portions of the first and second heating elements that are in contact with the first subcomponent and the second subcomponent, respectively; and joining the first subcomponent and the second subcomponent together whereby the first portions of the first subcomponent and the second subcomponent are fused together and the second portions of the first subcomponent and the second subcomponent are fused together.

3. The method according to claim 2, wherein joining the first and second subcomponents together comprises pressing the first and second subcomponents together.

4. The method according to claim 2, further comprising holding the first subcomponent in a first fixture and holding the second subcomponent in a second fixture.

5. The method according to claim 2, further comprising heating third portions of the first and second subcomponents to a third temperature during a heating interval, the third temperature being different than at least one of the first temperature and the second temperature.

6. The method according to claim 2, further comprising moving a carrier having a first set of heating elements and a second set of heating elements to a position between the first and second subcomponents and thereafter heating the first and second portions with the first and second sets of heating elements.

7. The method according to claim 1, wherein the insulator is disposed along the joining region of each of the at least two components.

8. The method according to claim 2, wherein the insulating layer is disposed along the portions of the first subcomponent and the second subcomponent that contact the first and second heating elements.

9. The method according to claim 2, wherein heating first portions of the first subcomponent and the second subcomponent to the first temperature and heating second portions of the first subcomponent and the second subcomponent to the second temperature occurs simultaneously.

* * * * *